June 5, 1945.　　B. EDELMAN ET AL　　2,377,409
ARTICLE FEEDING APPARATUS
Original Filed April 28, 1942　　3 Sheets-Sheet 3

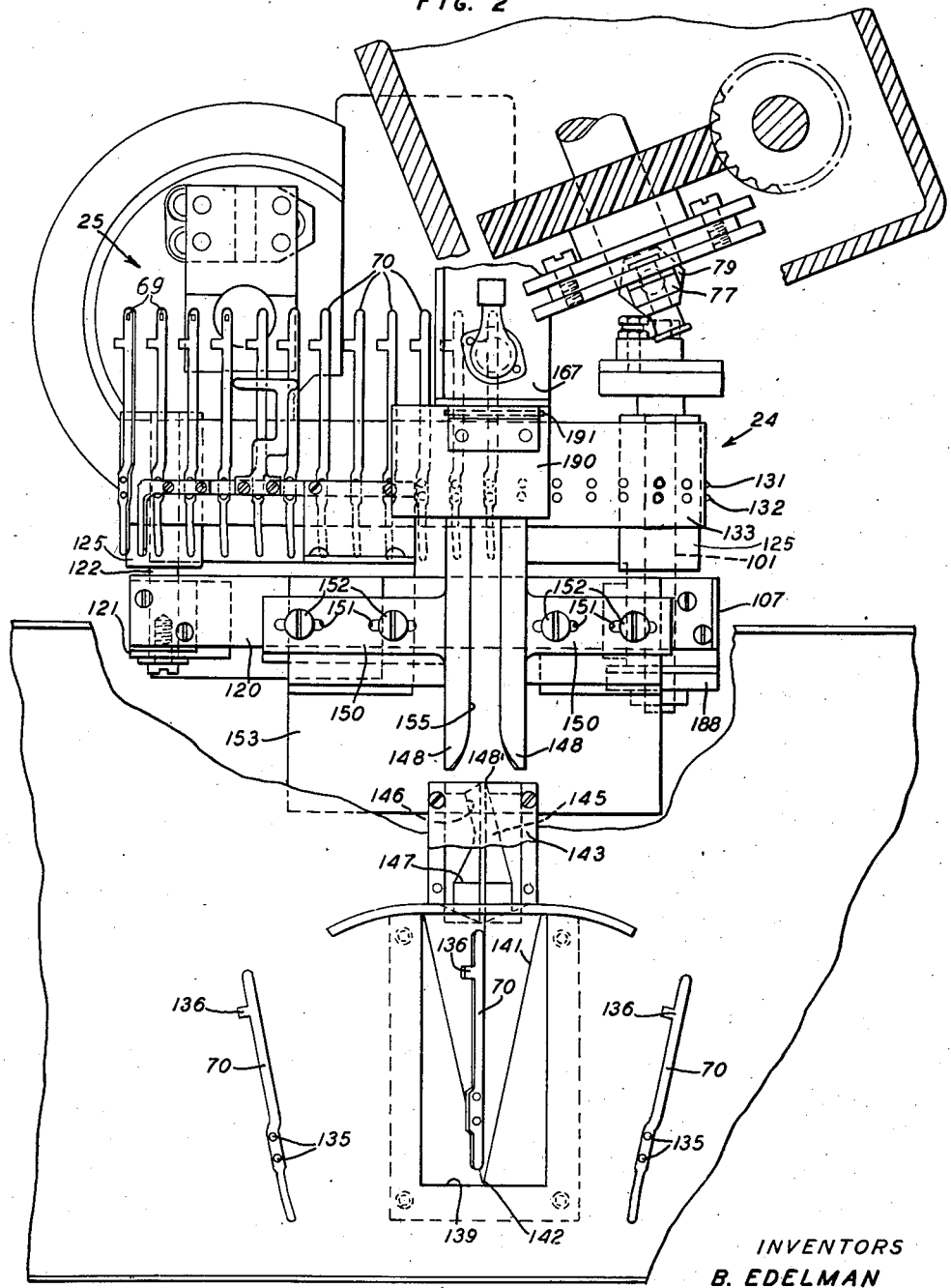

INVENTORS
B. EDELMAN
A.L. PIZZI
BY
E.R. Nowlan
ATTORNEY

Patented June 5, 1945

2,377,409

UNITED STATES PATENT OFFICE 2,377,409

ARTICLE FEEDING APPARATUS

Beril Edelman, Brooklyn, N. Y., and Albert L. Pizzi, Newark, N. J., assignors to Western Electric Company, Incorporated, New York, N. Y., a corporation of New York Original application April 28, 1942, Serial No. 440,826. Divided and this application March 5, 1943, Serial No. 478,217

3 Claims. (Cl. 193—43)

This invention relates to article feeding apparatus, and is a division of our copending application Serial No. 440,826 filed April 28, 1942.

In the manufacture of small articles or parts the ultimate cost thereof may vary depending upon the speed and accuracy in which the various steps of the manufacturing process, in each instance, are carried out. If certain of these steps include the manual feeding of the articles to a machine and the manual removal of such from the machine, then the maximum output of the machine depends largely on the efficiency of the operator. Therefore, the reduction of the time required for the feeding of the articles or parts to the machine and the assurance of accuracy in the feeding of such to the machine would not only reduce the physical strain on the operator to a minimum but would increase the efficiency of the machine to a maximum.

An object of the invention is to provide an apparatus for feeding articles in accurate and variable positions.

With this and other objects in view, the invention comprises a unit operable to move articles at predetermined spaced positions intermittently to a machine adapted to perform work on the articles, a chute structure to receive the articles and formed to orient the articles singly in accurate positions for mounting on the unit.

Other objects and advantages will be apparent from the following detailed description when considered in conjunction with the accompanying drawings, wherein Fig. 1 is a side elevational view of the apparatus;

Fig. 2 is an enlarged fragmentary top plan view of the apparatus shown in conjunction with a welding machine, portions of the apparatus being shown in section;

Figure 1:
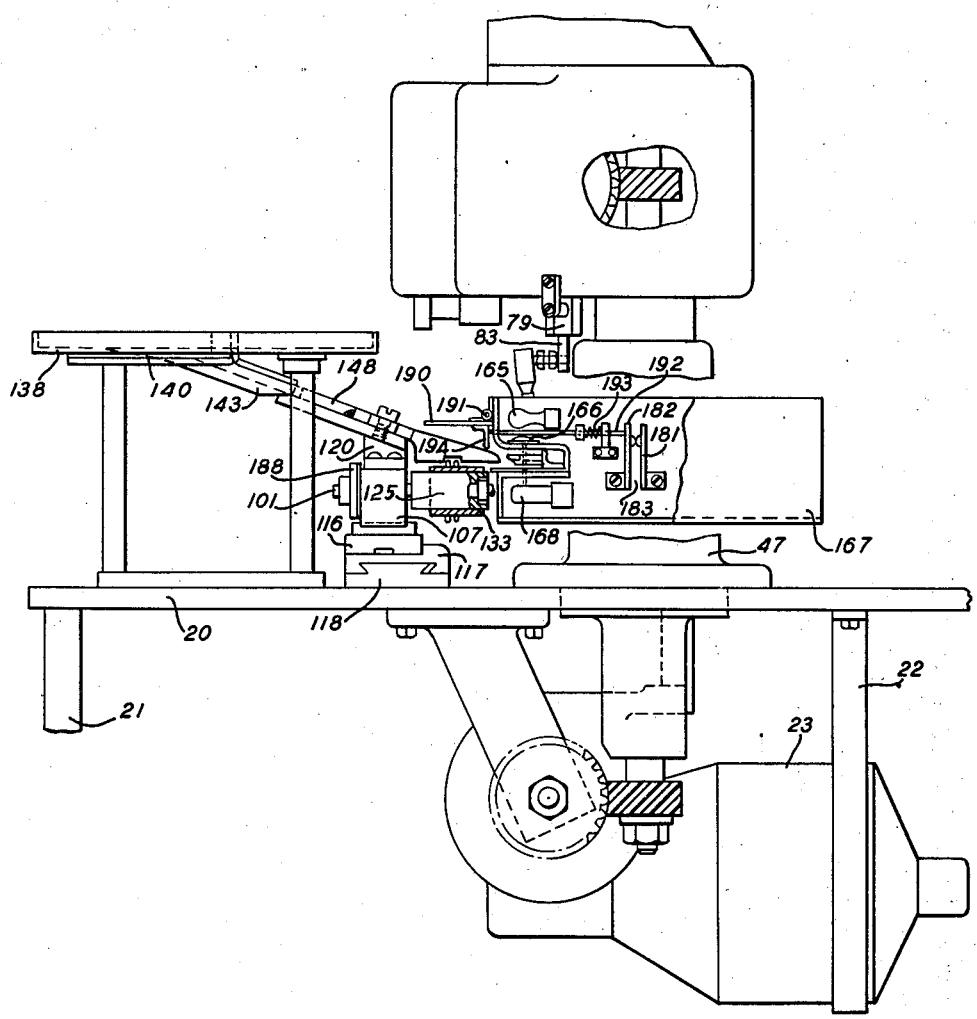

Referring now to the drawings, attention is first directed to Figs. 1 and 2. A suitable support 20 mounted upon legs 21, only one of which is shown in Fig. 1, has a suspending bracket 22 for supporting a motor 23. The motor 23 provides the power for moving an advancing unit, indicated generally at 24, and for operating a welding machine indicated generally at 25 through the aid of a mechanism shown and described in the parent case.

A bearing 107, for a part of the mechanism for transferring article from a receiving station to the welding machine, is mounted upon a plate 116 which in turn is mounted upon an adjustable slide 117, the latter being adjustably supported on a plate 118, the adjustment being possible through any suitable means not shown. The slide 117 also supports a plate 120 (Figs. 1 and 2) to support a bearing 121 for a shaft 122. The shaft 122 is mounted in a position parallel with the shaft 101. On each shaft there are mounted bearings to support a pulley 125. The pulley on the shaft 122 is mounted for free rotation as there is no need of a driving connection with its shaft while mechanism (not shown) under the control of the motor 23 drives the shaft 101 intermittently. Sets of locating pins or elements 131 are mounted at equally spaced positions, as illustrated in Fig. 2, on a belt 133 carried by the pulleys 125.

Figure 5:
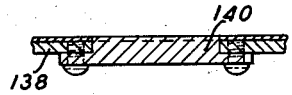
Fig. 5 is a fragmentary sectional view taken along the line 5—5 of Fig. 4.
Figure 6:
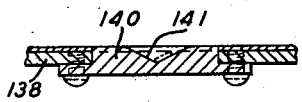
Fig. 6 is a fragmentary sectional view taken along the line 6—6 of Fig. 4.
Figure 7:
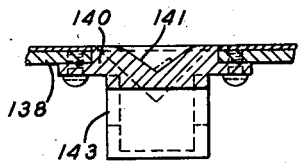
Fig. 7 is a fragmentary sectional view taken along the line 7—7 of Fig. 4.
Figure 10:
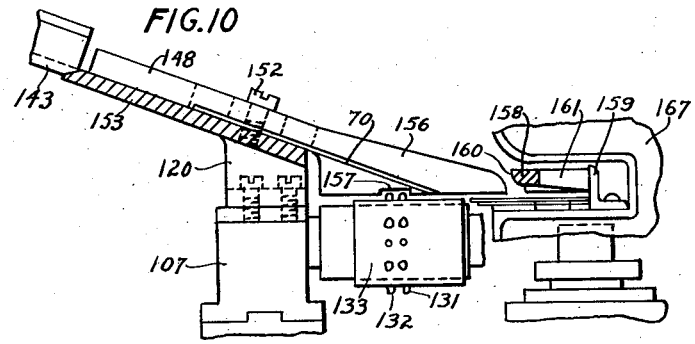
Fig. 10 is a fragmentary sectional view of a portion of the feeding chute.
Figure 3:
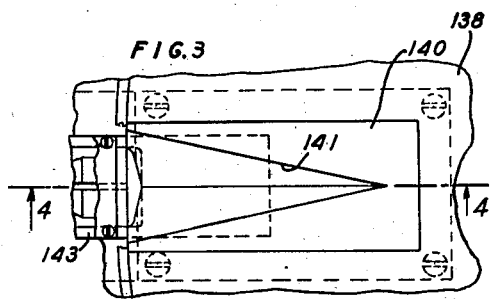
Fig. 3 is a fragmentary top plan view of the entrance end of the feeding chute.
Figure 4:
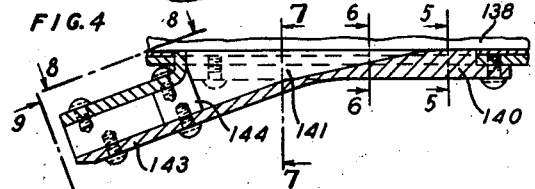
Fig. 4 is a fragmentary sectional view taken along the line 4—4 of Fig. 3.
Figure 8:
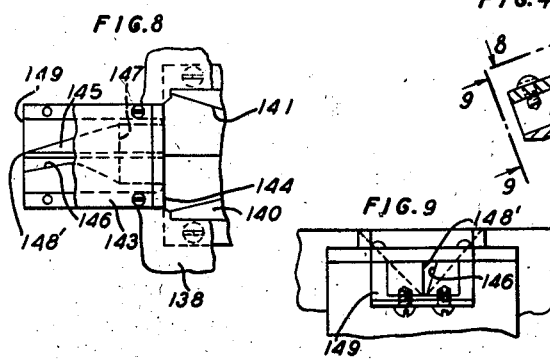
Fig. 8 is a fragmentary sectional view taken along the line 8—8 of Fig. 4.
Figure 9:
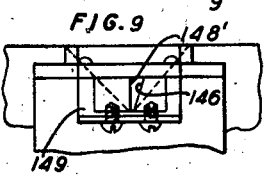
Fig. 9 is a fragmentary detailed view taken along the line 9—9 of Fig. 4.

Attention at this time is directed to the article 70 to be fed to the advancing unit 24. In the present embodiment the article 70 is one form of contact spring having mounting apertures 135 at spaced positions in one portion thereof adapted to receive the locating elements 131 of the belt 133. In the present illustration the spring 70 is provided with an integral projection 136 near the end thereof which is to receive the contact 69 at the welding unit 25. The contact 69 must, however, be welded on a definite side of the spring 70, and for this reason the location of the spring on the belt 133 is of great importance. Therefore, a feed controlling means illustrated in the drawings is provided. This means includes a table 138 upon which a supply of the articles or springs may be disposed. Near the center of the table 138 an opening 139 is provided to receive the entrance end of a chute 140 secured in place as illustrated in Figs. 2, 3 and 4. The chute includes a groove 141 which begins at a point 142 and becomes wider and deeper as it advances toward an orienting unit 143. The cross sectional contours of the chute are illustrated in Figs. 5, 6 and 7, beginning with a flat portion lying in a plane of the upper surface of the table at the point 142 and gradually increasing in width and depth until the groove reaches an entrance 144 of the orienting unit 143. The unit 143 has guide or controlling walls 145 and 146 respectively which function to assure feeding of the articles or springs 70 between final guides 148 with the projection 136 extending to the left (Fig. 2). The guide wall 145 extends from an angular position 147, similar to the adjacent angular wall of the groove 141 in the chute 140 near the entrance end 144, to a vertical position 148' at an exit end 149 of the unit. Therefore, if the article should lean to the right (Fig. 2) in passing down the chute 140 and remain in this position while entering the unit 143, the article would move into engagement with the guide wall 145 and would be moved from a leaning position to a vertical position due to the contour of the wall. This action on the article during its advancement will turn the article in a rotating motion during its longitudinal advancement, to orient the article and cause it to lie on its other side with the projection 136 located at the left (Fig. 2). The wall 146 extends through a particular arc between the entrance end 144 and the exit end 149, this contour causing an article passing down the chute 140 and leaning toward the left (Fig. 2) to be rocked arcuately on the lower edge thereof so that it will be moved into the control of the guide wall 145. The guides 148 are of the contour illustrated in Figs. 1, 2 and 10, with outwardly curved inner surfaces at their entrance ends and integral outwardly projecting lugs 150 with elongate apertures 151 therein for receiving screws 152, through the aid of which the guides may be secured to a support 153. The support 153 is in the form of a tilted table with integral brackets 154 adapted for mounting on the bearings 107 and 121. The guides 148 accurately direct the articles 70 singly to the belt and locate the articles so that the apertures 136 therein will register with the locating elements 131 positioned between the guides at the time the part is fed thereto. Fig. 10 illustrates more in detail the exit end of the guides which extend across the belt and downwardly to positions close to the belt 133, with grooves 157 in the lower surfaces thereof for the movement of the locating elements 131 relative thereto. The guides also extend to points adjacent a stop 158 rigidly supported by a bracket 159. The stop 158 is grooved at 160 to receive the end of the article 70 and to cooperate with the other feeding means in maintaining the accurate location of the article with respect to the locating elements 131 on the belt which have previously been positioned to receive the article.

Attention is now directed to Figs. 1 and 2, which illustrate a transparent cover 190 pivotally supported at 191 to extend over the belt 133 and the guides 148, to make it possible for the operator to view the feeding of the parts singly in place on the belt but to serve as a guard against access to the belt at this position during the operation of the apparatus. Associated with the cover 190 is a spring pressed plunger 192 mounted for longitudinal movement by the force of a spring 193, to effect opening of the contacts 181 and 182 when the cover 190 is swung upwardly about its pivot, an annular abutting member 149 being mounted upon the under surface of the cover and adapted to move the plunger 192 rearwardly to close the contacts and to maintain them closed while the guard is in its normal position. Thus, upon movement of the guard out of its normal position, a circuit controlling the motor 23 will be opened by the opening of the contacts 181 and 182.

Upon considering the operation of the apparatus, let it be assumed that a desired number of parts or springs 70 has been fed to the apparatus and that the belt 133 is partially filled with the springs. When in the position shown in Fig. 2, a spring 70 has just been fed down the chute 140, through the unit 143, between the guides 148, and onto the belt, and another spring is in position in the chute 140 to be sent on its way.

At this time the operator may allow the spring 70 shown positioned in the chute 140 to move downwardly to assume its position on the belt. When the spring is allowed to travel downwardly, the operator only has to be sure that the proper end of the spring is in advance and need not determine whether or not the spring is lying upon the correct side. In moving downwardly, the spring will enter the unit 143 and, as shown, the projection 136 is upon the left side. The spring, in passing through the unit 143, will be controlled by the guide walls 145 and 146, which assure location of the spring in the correct position when it enters the chute formed by the guides 148 and the support 153. The wall 146 will cause the spring to rock to a position where it will be under the control of the wall 145, moving the spring from a position leaning toward the left to an angular position in engagement with the wall 145, the latter effecting movement of the spring to a vertical position, the momentum of the spring during the downward travel thereof causing the spring to lie in the proper position as it enters the chute 148. If the spring 70 is placed in the chute 140 so that it will lie on its opposite side with the projection 136 extending to the right, then the spring will be under the complete control of the wall 145, which will raise the spring from a lying down position on one side in the chute 140 to a vertical position, at 148', during its travel through the unit 143, resulting in the turning of the spring so that it will lie on the opposite side from that from which it started its travel. When the spring enters the lower chute in the correct position, it continues its travel between and under the control of the guides 148 until its forward end strikes the inner end of the stop 158. At this time the rearmost end of the spring will be free to drop downwardly, the guides 148 and the stop 158 controlling the spring to cause it to drop so that the control elements 131 will enter the apertures 136 of the spring.

All that is necessary of the operator is the feeding of the springs down the chute in any desired manner, making sure that the proper end of the spring is advanced to the chute and that there is a sufficient time interval between each advanced spring for the operation of the apparatus and the welding machine. This time interval may be readily recognized through the actuation of the mechanism.

If by accident a spring should be fed to the chute with the wrong end foremost, such a spring may be safely removed manually but in order to do so the cover 190 must be moved upwardly and as a result thereof the plunger 192 is released to effect opening of the switch 183 so that the apparatus and the machine will be rendered inoperative until the spring is removed and the cover again lowered to close the switch. Furthermore, if it is desirable to feed the springs so that they will fall on the reverse side the members of the unit 143 having the respective surfaces 145 and 146 may be reversed and the guides 148 may be adjusted to bring about this result.

Although specific improvements of the invention have been shown and described, it will be understood that they are but illustrative and that various modifications may be made therein without departing from the scope and spirit of this invention as defined by the appended claims.

What is claimed is:

1. An apparatus for advancing articles comprising an article receiving member, a chute into which elongate articles each having a projection on one side thereof may be directed with the projections extending in either direction, a unit interposed between the chute and the receiving member and having article controlling surfaces, one adapted to orient all of the articles received in engagement therewith to cause them to enter the receiving member with their projection extending in a given direction, the other surface adapted to be engaged by the projection of articles not received in engagement with the first surface to move the said articles into engagement with the first surface to be oriented thereby.

2. An apparatus for advancing articles comprising an article receiving member, a table having an aperture therein and a supporting surface lying in a given plane for supporting flat articles having projections on one side thereof, a chute disposed in the said aperture and having its entrance end lying in the said plane to singly receive the articles from the supporting surface with their projections extending in any of a plurality of directions, and means interposed between the exit end of the chute and the receiving member to cause each article to enter the receiving member with its projection extending in a given direction regardless of the direction its projection extends upon entering the chute.

3. An apparatus for advancing articles comprising an article receiving member, a table having an aperture therein and a supporting surface lying in a given plane for supporting flat articles having projections on one side thereof, a chute disposed in the said aperture and having its entrance end lying in the said plane to singly receive the articles from the supporting surface with their projections extending in any of a plurality of directions, a unit interposed between the chute and the receiving member and having a surface adapted to orient the articles to cause each article to enter the receiving member with its projection extending in a given direction regardless of the direction its projection extends upon entering the chute, and means adapted for engagement by the projection to move the articles into engagement with the said orienting surface.

BERIL EDELMAN.
ALBERT L. PIZZI.